US012225282B2

(12) United States Patent
Kobashi et al.

(10) Patent No.: US 12,225,282 B2
(45) Date of Patent: Feb. 11, 2025

(54) IMAGING SYSTEM, GUIDANCE CONTROL METHOD, AND STORAGE MEDIUM

(71) Applicant: HONDA MOTOR CO., LTD., Tokyo (JP)

(72) Inventors: Shinichiro Kobashi, Wako (JP); Makoto Hasegawa, Wako (JP); Sachiko Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 17/953,354

(22) Filed: Sep. 27, 2022

(65) Prior Publication Data
US 2023/0095638 A1    Mar. 30, 2023

(30) Foreign Application Priority Data
Sep. 30, 2021 (JP) ................ 2021-161621

(51) Int. Cl.
*H04N 23/60* (2023.01)
*G01C 21/34* (2006.01)
*G06Q 10/02* (2012.01)
*H04N 23/667* (2023.01)
*H04N 23/695* (2023.01)

(52) U.S. Cl.
CPC ............ *H04N 23/64* (2023.01); *G01C 21/34* (2013.01); *G06Q 10/02* (2013.01); *H04N 23/667* (2023.01); *H04N 23/695* (2023.01)

(58) Field of Classification Search
CPC .................................... G05D 2107/87
See application file for complete search history.

(56) References Cited

U.S. PATENT DOCUMENTS

| 6,819,783 | B2* | 11/2004 | Goldberg | ........... H04N 1/00167 |
| | | | | 707/E17.023 |
| 10,922,933 | B2* | 2/2021 | Linguanti | ........ G06Q 10/06398 |
| 2018/0071643 | A1* | 3/2018 | Cortelyou | ................ A63G 7/00 |
| 2022/0006926 | A1* | 1/2022 | Knox | ..................... G03B 17/02 |

FOREIGN PATENT DOCUMENTS

| JP | 2010-266410 | 11/2010 |
| JP | 2021-523471 | 9/2021 |
| WO | 2012/073301 | 6/2012 |
| WO | 2019/217742 | 11/2019 |

OTHER PUBLICATIONS

Japanese Office Action for Japanese Patent Application No. 2021-161621 mailed Jul. 11, 2023.

* cited by examiner

Primary Examiner — Todd Melton
Assistant Examiner — Sarah A. Mueller
(74) Attorney, Agent, or Firm — Amin, Turocy & Watson, LLP

(57) ABSTRACT

Provided is an imaging system including an imager configured to image a ridable moving object positioned at a registered photo spot, and a processor configured to execute a program to cause a guide to guide the ridable moving object on which a user gets and which is positioned near the photo spot to a recommended position in the photo spot.

8 Claims, 11 Drawing Sheets

IMAGING SYSTEM, GUIDANCE CONTROL METHOD, AND STORAGE MEDIUM

CROSS-REFERENCE TO RELATED APPLICATION

Priority is claimed on Japanese Patent Application No. 2021-161621, filed Sep. 30, 2021, the content of which is incorporated herein by reference.

BACKGROUND

Field of the Invention

The present invention relates to an imaging system, a guidance control method, and a storage medium.

Description of Related Art

A system has been known which uploads an image of taken photo to a server when a moving object arrives at a point where a photo will be taken and the photo is taken (for example, see Japanese Unexamined Patent Application, First Publication No. 2010-266410).

SUMMARY OF THE INVENTION

Even if a moving object arrives at a point where a photo will be taken, a subject may not be positioned at a position suitable to take the photo.

The present invention has been made in consideration of such circumstances and an objective of the present invention is to provide an imaging system, a guidance control method, and a storage medium capable of causing a subject to be positioned at a position suitable for imaging.

An imaging system, a guidance control method, and a storage medium according to the present invention adopt the following configurations.

(1): According to an aspect of the present invention, there is provided an imaging system including an imager configured to image a ridable moving object positioned at a registered photo spot and a processor configured to execute a program to cause a guide to guide the ridable moving object on which a user gets and which is positioned near the photo spot to a recommended position in the photo spot.

(2): In the above-described aspect (1), the processor is further configured to cause the guide to guide a plurality of grouped ridable moving objects to the recommended position.

(3): In the above-described aspect (2), the processor is further configured to receive a reservation for the plurality of grouped ridable moving objects and cause the guide to guide the plurality of grouped ridable moving objects at the time of the reservation to the recommended position.

(4): In the above-described aspects (1) to (3), the processor is further configured to receive designation of an imaging condition at the time of imaging by the imager, and cause the guide to guide the ridable moving object in accordance with the imaging condition.

(5): In the above-described aspects (1) to (4), the imager is configured to perform imaging based on a first imaging mode in which the imaging is performed when a prescribed period of time has elapsed after an execution operation of an instructor was performed and a second imaging mode in which the imaging is performed in accordance with an operation of an operator. The processor is further configured to switch the imaging mode to the first imaging mode or the second imaging mode.

(6): In the above-described aspects (1) to (5), the imager is installed in another ridable moving object different from the ridable moving object.

(7): In the above-described aspects (1) to (6), the imaging system further includes a first adjuster configured to adjust a height position of the user getting on the ridable moving object and a second adjuster configured to adjust a height position of the imager. The processor is further configured to adjust at least one of height positions of the first adjuster and the second adjuster.

(8): In the above-described aspect (7), the first adjuster may adjust the height position on a basis of at least one of user information about the user and a request of the user.

(9): In the above-described aspects (1) to (8), the processor is configured to cause the ridable moving object to be driven or instruct the user to operate the ridable moving object.

(10): According to an aspect of the present invention, there is provided a guidance control method including causing, by a computer, a guide to guide a ridable moving object on which a user gets and which is positioned near a registered photo spot included in an imaging range of an imager for imaging the ridable moving object to a recommended position in the photo spot.

(11): According to an aspect of the present invention, there is provided a non-transitory computer-readable storage medium storing a program for causing a computer to execute a process of causing a guide to guide a ridable moving object on which a user gets and which is positioned near a registered photo spot included in an imaging range of an imager for imaging the ridable moving object to a recommended position in the photo spot.

According to the aspects (1) to (11), it is possible to cause a subject to be positioned at a position suitable for imaging.

DETAILED DESCRIPTION OF THE INVENTION

Hereinafter, embodiments of an imaging system, a guidance control method, and a storage medium of the present invention will be described with reference to the drawings.

Ridable moving objects are installed in, for example, amusement facilities such as amusement parks and theme parks. The ridable moving object matches an own vehicle with a user who owns a terminal device, for example, on the basis of an electrical signal transmitted by the owned terminal device, and sets usage authority for the matched user. The ridable moving object is rented to the user for whom the usage authority is set. The ridable moving object may be brought into an amusement facility by the user. The user may have exclusive usage authority to use the ridable moving object brought into the amusement facility by the user or the ridable moving object brought into the amusement facility by the user may be set for another person different from a user U.

First Embodiment

Figure 1:
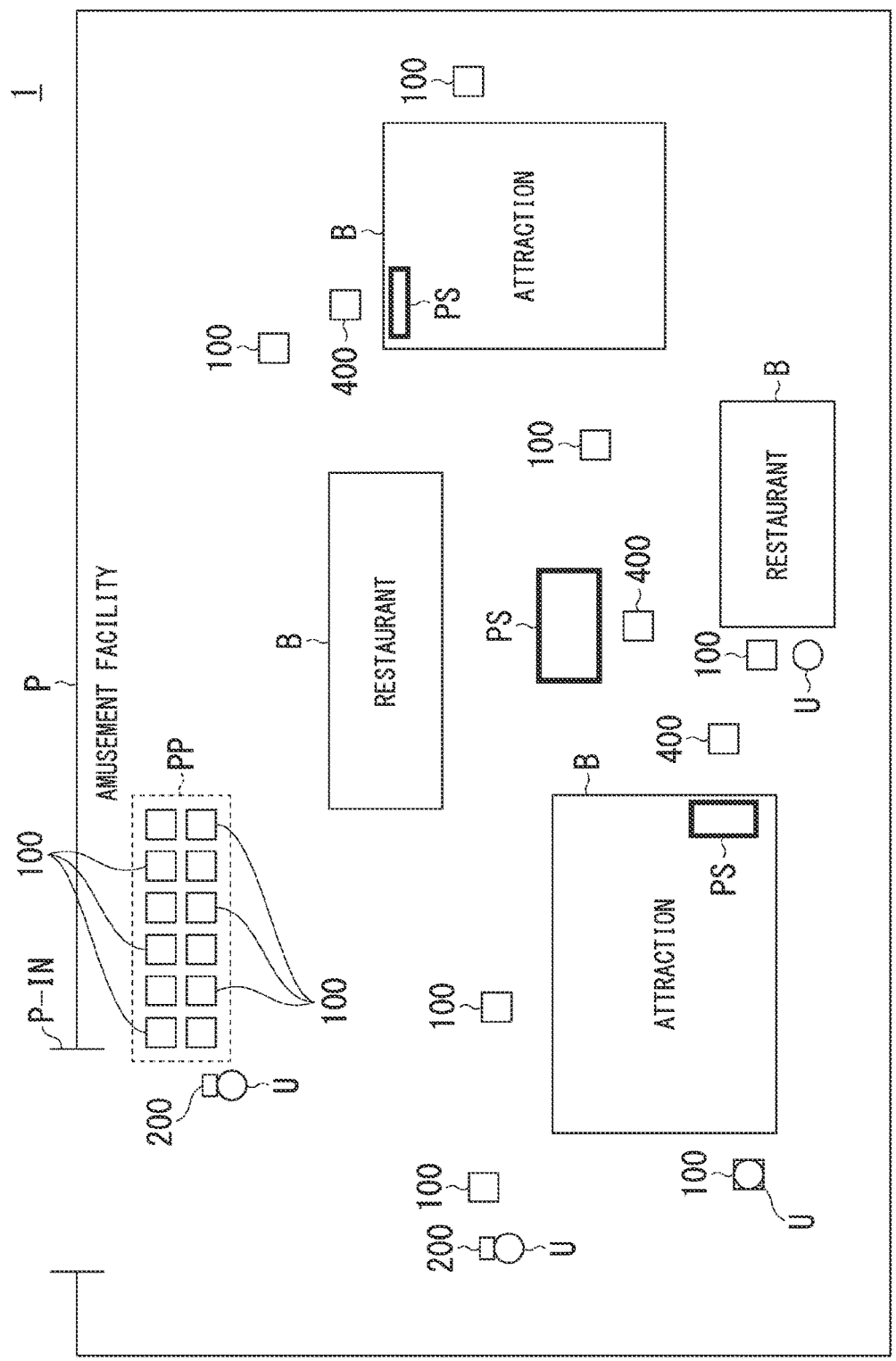
FIG. 1 is an explanatory diagram for describing an outline of an imaging system 1 of a first embodiment.

FIG. 1 is an explanatory diagram showing an outline of an imaging system 1 of a first embodiment. The imaging system 1 includes, for example, a ridable moving object 100 and a terminal device 200. A plurality of ridable moving objects 100 are deployed in an amusement facility P. The ridable moving object 100 for which usage authority is not set is, for example, stored in a parking pool PP provided near an entrance P-IN of the amusement facility P or goes around the premises of the amusement facility P. The ridable moving object 100 for which the usage authority is set travels in accordance with the operation of the user U having gotten on the ridable moving object 100 or waits for the user U to get thereon again when the user U gets off the ridable moving object 100. The terminal device 200 is possessed by, for example, the user U.

The ridable moving object 100 includes, for example, a control device for matching the user U with the ridable moving object 100 by operating the terminal device 200 possessed by the user U. By operating the terminal device 200, the user U acquires usage authority to use the ridable moving object 100 for use in the amusement facility P. For example, the user U may acquire the usage authority to use the ridable moving object 100 disposed near the entrance P-IN when he or she enters the amusement facility P or the user U may acquire the usage authority to use the ridable moving object 100 that goes around the premises of the amusement facility P. For example, the user U for whom the usage authority to use the ridable moving object 100 is set moves by getting on the ridable moving object 100 or uses an internal facility B by causing the ridable moving object 100 to stop in the vicinity of the internal facility B such as an attraction or a restaurant within the amusement facility P.

A plurality of photo spots PS are registered in advance within the amusement facility P. The photo spot PS is, for example, a spot having the better appearance in a background or the like when the user U takes a photo to commemorate the visit to the amusement facility P. For example, the photo spot PS may be set in the vicinity of an internal facility B, which is an attraction, or may be set at a position including the internal facility B, which looks good when a photo is taken, or other landscapes.

Figure 2:
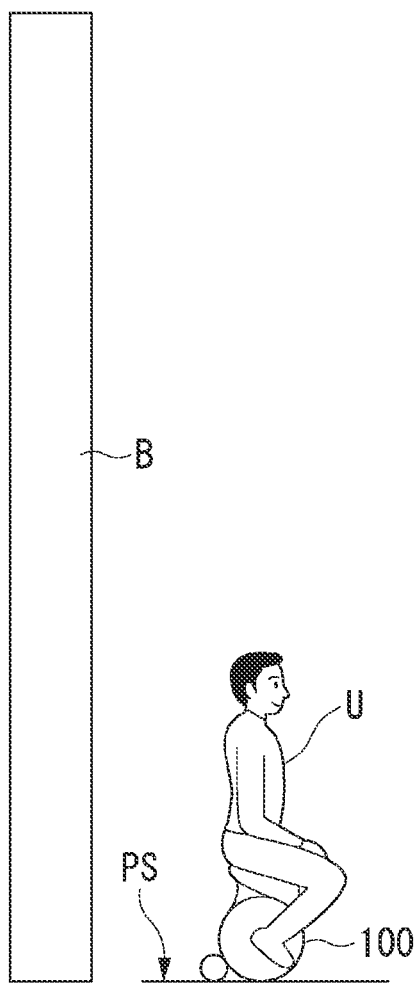
FIG. 2 is a diagram for describing a state in which a user having gotten on a ridable moving object 100 is imaged by an internal imaging device 400.
Figure 2:
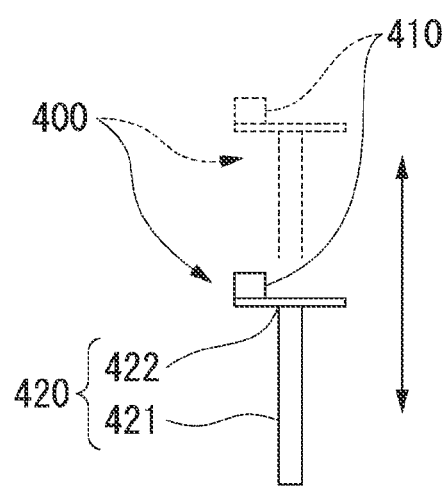

An internal imaging device 400 is provided in the vicinity of the photo spot PS. FIG. 2 is a diagram for describing a state in which a user having gotten on the ridable moving object 100 is imaged by the internal imaging device 400. The internal imaging device 400 is disposed at a position where the user U getting on the ridable moving object 100 positioned at the photo spot PS set near the internal facility B can be imaged. The internal imaging device 400 includes, for example, an internal camera 410 and a raising/lowering device 420. The raising/lowering device 420 includes a raising/lowering mechanism 421 and a mounting plate 422.

The internal camera 410 is, for example, a digital camera, and for example, the ridable moving object 100 on which the user U gets is imaged together with the user U. The internal camera 410 is disposed such that the ridable moving object 100 positioned at the photo spot PS can be imaged together with the user U. The internal camera 410 is mounted on the mounting plate 422. The raising/lowering mechanism 421 is a member that allows the mounting plate 422 to be raised and lowered. The raising/lowering mechanism 421 raises and lowers the internal camera 410 via the mounting plate 422 in accordance with control of the control device 150 to be described below and adjusts a height position to the internal camera 410. The raising/lowering mechanism 421 is an example of a second adjuster.

A first imaging mode and a second imaging mode are set as imaging modes in the internal camera 410. The first imaging mode is a mode in which imaging is executed when a prescribed period of time has elapsed after the execution operation of the instructor was performed, and is, for example, a mode using a so-called self-timer. The instructor is, for example, the user U, but may be another person, for example, a companion of the user U or a cast member of the amusement facility P. When the internal camera 410 whose imaging mode is the first imaging mode has received an execution request signal transmitted by the terminal device 200, the internal camera 410 executes imaging when a preset period of time, for example, 10 seconds, has elapsed.

The second imaging mode is, for example, a mode in which imaging is executed in accordance with the operation of the operator. The second imaging mode is, for example, a mode in which an operator operates (presses) a shutter button to perform imaging. The operator may be a user or may be a person other than the user, for example, a companion of the user U or a cast member of the amusement facility P.

The internal camera 410 stores a captured image as image data in a storage provided in the internal camera 410. Instead of or in addition to storing the image data, the internal camera 410 may be configured to transmit the image data of the captured image to the ridable moving object 100 or the terminal device 200. The internal camera 410 may store image data in a storage medium capable of being attached to and detached from the internal camera 410. The storage may be provided outside of the internal camera 410 in the internal imaging device 400. The image data stored by the storage is provided to the user U with or without a fee.

Figure 3:
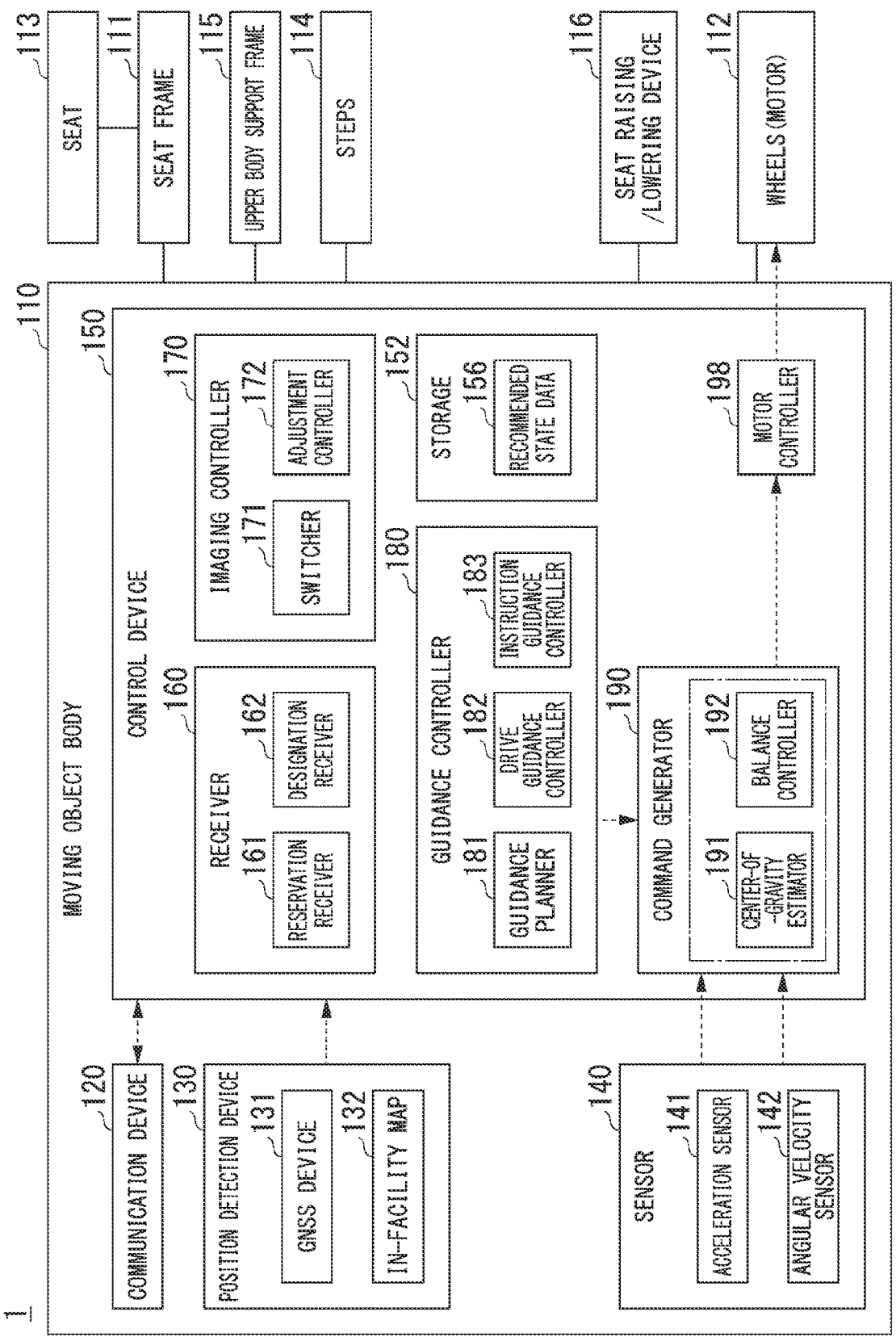
FIG. 3 is a configuration diagram showing an example of the ridable moving object 100.

FIG. 3 is a configuration diagram showing an example of the ridable moving object 100. The ridable moving object 100 includes, for example, a moving object body 110, a communication device 120, a position detection device 130, a sensor 140, and a control device 150. The moving object body 110 includes, for example, a seat frame 111, wheels 112, a seat 113, a step 114, an upper body support frame 115, and a seat raising/lowering device 116.

Figure 4:
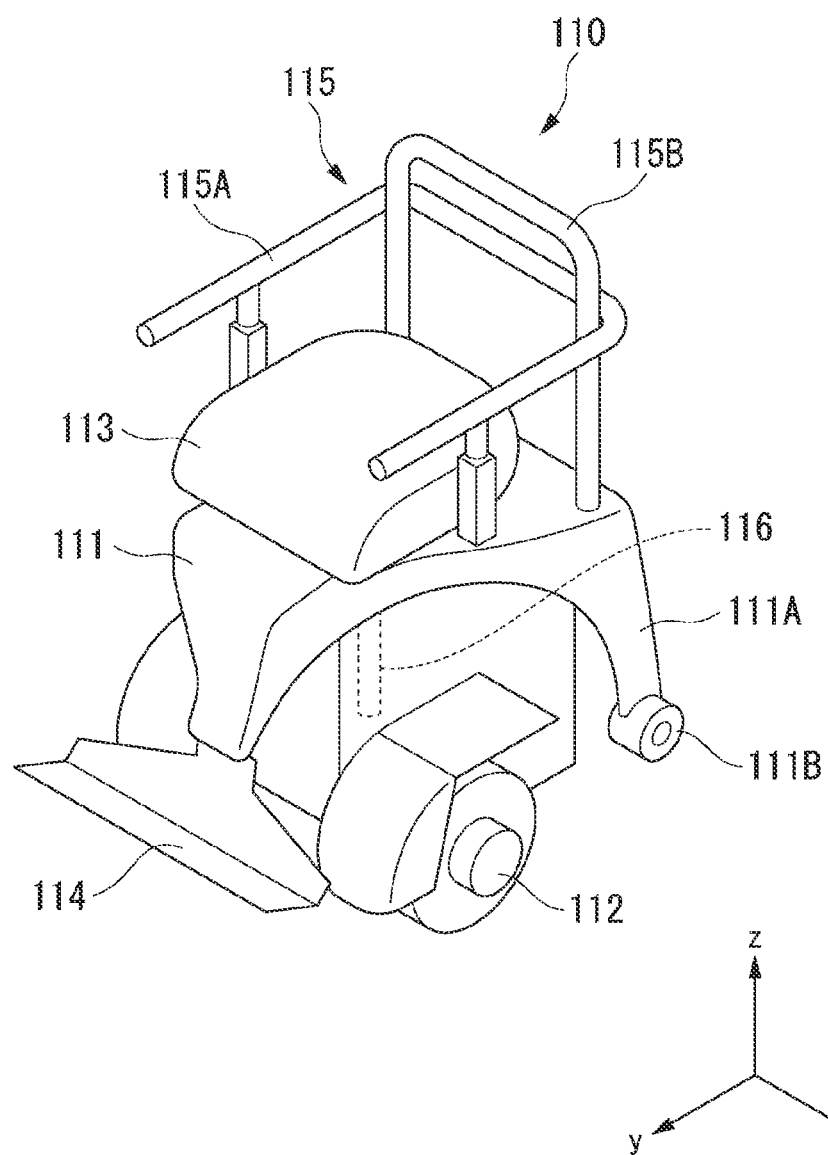
FIG. 4 is a perspective view showing an internal structure of the ridable moving object 100.

FIG. 4 is a perspective view showing an internal structure of the ridable moving object 100. In FIG. 4, a width direction of the ridable moving object 100 is referred to as an x-direction, a forward-rearward direction thereof is referred to as a y-direction, and an upward-rearward direction thereof is referred to as a z-direction. The forward direction of the ridable moving object 100 is a positive direction of a y-axis (a direction from the back side of the paper surface to the front side of the paper surface, hereinafter referred to as a +y-axis direction) and the rearward direction thereof is a negative direction of the y-axis (a direction from the front side of the paper surface to the back side of the paper surface, hereinafter referred to as a −y-axis direction).

The seat frame 111 is made of resin, for example. The seat frame 111 is provided in the forward-rearward direction through a substantially central position in the width direction of the ridable moving object 100. A landing leg 111A is behind the seat frame 111. A universal caster 111B is attached to the lower end of the landing leg 111A. The universal caster 111B is a caster that can rotate around a vertical axis. The wheels 112 are attached to the left and right sides of the seat frame 111. The wheels 112 are driven, for example, by a motor.

The seat 113 is attached above the seat frame 111. The seat 113 is a member on which the user U getting on the ridable moving object 100 sits. The step 114 is attached to the lower front portion of the seat frame 111. The step 114 is a member on which the user U places the legs. The step 114 is a variable step whose width and height can be adjusted.

The upper body support frame 115 includes an armrest frame 115A and a backrest frame 115B. The armrest frame 115A is disposed at left and right positions above the seat 113. The armrest of the user U is provided by covering the armrest frame 115A with a cushion. The backrest frame 115B is disposed at a rear position above the seat 113. The backrest of the user U is provided by covering the backrest frame 115B with a cushion.

The seat raising/lowering device 116 in the ridable moving object 100 is provided below the seat frame 111 and the seat 113 is provided on the top of the seat raising/lowering device 116. The seat raising/lowering device 116 adjusts the height position of the user U sitting on the seat 113 with respect to the ridable moving object 100 by raising and lowering the seat 113. The seat raising/lowering device 116 is an example of a first adjuster.

Returning to FIG. 3, the communication device 120 performs wireless communication on the basis of, for example, Wi-Fi, DSRC, Bluetooth (registered trademark), and other communication standards. The communication device 120 receives an electrical signal transmitted by the terminal device 200 and outputs the received electrical signal to the control device 150. The communication device 120 transmits an electrical signal output by the control device 150 to the terminal device 200.

The position detection device 130 includes, for example, a global navigation satellite system (GNSS) device 131 and an in-facility map 132. The GNSS device measures a position of the ridable moving object 100 on the basis of radio waves received from, for example, a GNSS satellite (for example, a GPS satellite). The in-facility map 132 is map information within the amusement facility P. The GNSS device 131 detects a position of the ridable moving object 100 within the amusement facility P with reference to the measured position of the ridable moving object 100 in the in-facility map 132. The position detection device 130 generates a position signal based on the detected position of the ridable moving object 100. The position detection device 130 outputs the generated position signal to the control device 150.

The sensor 140 includes, for example, an acceleration sensor 141 and an angular velocity sensor 142. The acceleration sensor 141 is attached to any location on one or both of the body 110 and the seat 113. The acceleration sensor 141 detects acceleration acting on an attachment location and outputs the detected acceleration to the control device 150. Likewise, the angular velocity sensor 142 is attached to any location on one or both of the moving object body 110 and the seat 113. The angular velocity sensor 142 detects an angular velocity acting on the attachment location and outputs the detected angular velocity to the control device 150.

The control device 150 includes, for example, a receiver 160, an imaging controller 170, a guidance controller 180, a command generator 190, and a motor controller 198. The receiver 160 includes, for example, a reservation receiver 161 and a designation receiver 162. The imaging controller 170 includes, for example, an adjustment controller 171 and a switcher 172. The guidance controller 180 includes, for example, a guidance planner 181, a drive guidance controller 182, and an instruction guidance controller 183.

These components are implemented, for example, by a hardware processor such as a central processing unit (CPU) executing a program (software). Some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as a hard disk drive (HDD) or a flash memory or may be stored in a removable storage medium (a non-transitory storage medium) such as a DVD or a CD-ROM and installed in the storage device when the storage medium is mounted in a drive device. The storage device functions as a storage 152 in which recommended state data 156 is stored.

The recommended state data 156 is a map showing a recommended state designated for each photo spot PS. The recommended state includes recommended position data of the ridable moving object 100 in which the user U having gotten on the ridable moving object 100 is in a state suitable for imaging and recommended height position data of the internal camera 410 and the user, for example, in the photo spot PS. The functions of parts of the control device 150 will be described after the description of the functions of the terminal device 200.

Figure 5:
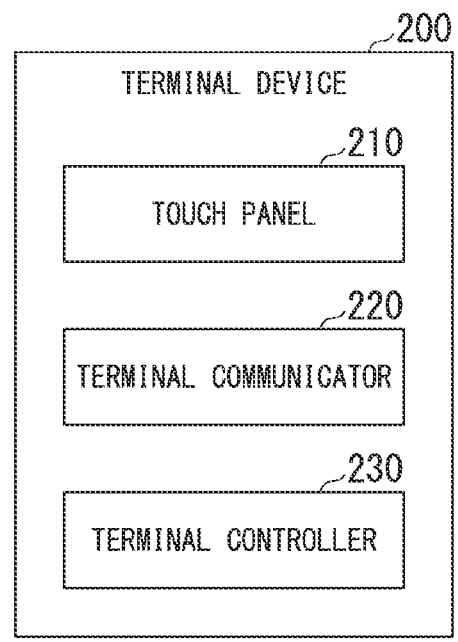
FIG. 5 is a configuration diagram showing an example of a terminal device 200.

FIG. 5 is a configuration diagram showing an example of the terminal device 200. The terminal device 200 is, for example, a portable terminal such as a smartphone or a tablet owned by the user U. In the terminal device 200, an application program for employing a service using the ridable moving object 100, a browser, or the like is activated to support the service to be described below. In the following description, it is assumed that the terminal device 200 is a smartphone and an application program (a moving object rental application) is being activated.

The terminal device 200 includes, for example, a touch panel 210, a terminal communicator 220, and a terminal controller 230. The touch panel 210 displays, for example, a graphical user interface (GUI) image and receives an input operation such as an operation in which the user U touches the GUI image by hand. The touch panel 210 outputs an electrical signal corresponding to the received input operation to the terminal controller 230. The terminal communicator 220 performs wireless communication on the basis of, for example, Wi-Fi, DSRC, Bluetooth (registered trademark), and other communication standards. The terminal communicator 220 transmits a signal output by the terminal controller 230 to the communication device 120 of the ridable moving object 100.

The terminal controller 230 generates an electrical signal corresponding to the input operation of the user U output by the touch panel 210 and outputs the generated electrical signal to the terminal communicator 220. For example, when the user U outputs an electrical signal corresponding to an operation of requesting a reservation for the ridable moving object 100 through the touch panel 210, the terminal controller 230 generates a reservation request signal for requesting the reservation for the ridable moving object 100 by the user U and outputs the generated reservation request signal to the terminal communicator 220. The user U may request a reservation by designating the number of people associated with the reservation. In this case, information about the number of people for whom the user U has made the reservation is added to the reservation request signal.

For example, when the user U has output an electrical signal corresponding to an operation of requesting the designation of the imaging condition through the touch panel 210, the terminal controller 230 generates a designation request signal for requesting the designation of an imaging condition of the ridable moving object 100 by the user U and outputs the generated designation request signal to the terminal communicator 220. For example, when the user U has output an electrical signal corresponding to an operation of requesting the switching of the imaging mode set in the internal camera 410 of the internal imaging device 400 through the touch panel 210, the terminal controller 230 generates a switching request signal for requesting the switching of the imaging mode of the ridable moving object 100 by the user U and outputs the generated switching request signal to the terminal communicator 220.

For example, when an electrical signal corresponding to an operation of requesting the internal camera 410 whose imaging mode is a first imaging mode to execute an imaging process has been received, the terminal controller 230 generates an execution request signal for requesting the internal camera 410 to execute the imaging process and outputs the generated execution request signal to the terminal communicator 220. The terminal communicator 220 transmits the reservation request signal, the designation request signal, and the switching request signal output by the terminal controller 230 to the communication device 120 of the ridable moving object 100. The terminal communicator 220 outputs the execution request signal output by the terminal controller 230 to the internal camera 410.

The terminal communicator 220 receives the electrical signal transmitted by the communication device 120 of the ridable moving object 100 and outputs the received electrical signal to the terminal controller 230. For example, the terminal controller 230 controls a display process of the touch panel 210 or causes a sound to be output from a speaker (not shown) on the basis of the electrical signal output by the terminal communicator 220.

Hereinafter, the functions of parts of the control device 150 of the ridable moving object 100 will be described again. When the communication device 120 has received the reservation request signal transmitted by the terminal device 200, the reservation receiver 161 in the receiver 160 of the control device 150 receives a reservation for the user who owns the terminal device 200. The reservation receiver 161 arranges the ridable moving object 100 on the basis of the received reservation. When the number of people associated with the reservation is added to the reservation request signal, the reservation receiver 161 arranges ridable moving objects 100 for the number of people associated with the reservation including its own moving object.

The reservation receiver 161 transmits a reservation request signal to another moving object (a ridable moving object 100 other than an own moving object) that has been arranged using the communication device 120. Even if the reservation request signal transmitted by the own moving object is received, the reservation receiver 161 of another moving object executes a process as in a case where a reservation request signal for which the number of people associated with a reservation transmitted by the terminal device 200 is one has been received.

When the communication device 120 has received the designation request signal transmitted by the terminal device 200, the designation receiver 162 causes the storage 152 to store the imaging condition indicated in the designation request signal Imaging conditions include, for example, information such as a designated photo spot where an imaging process is desired to be performed by the user U, a designated imaging time period, and a designated angle at the time of imaging.

When the communication device 120 has received the designation request information transmitted by the terminal device 200 and the ridable moving object 100 has been positioned in the photo spot, the adjustment controller 171 in the imaging controller 170 reads the recommended state data 156 stored in the storage 152. The adjustment controller 171 decides the height positions of the user U sitting on the seat 113 and the internal camera 410 on the basis of the recommended height position data included in the read recommended state data 156 and the imaging conditions indicated in the designation request information.

The adjustment controller 171 generates a first adjustment signal corresponding to the decided height position of the user U and outputs the first adjustment signal to the seat raising/lowering device 116. The seat raising/lowering device 116 raises and lowers the seat 113 on the basis of the output first adjustment signal. The adjustment controller 171 generates a second adjustment signal corresponding to the decided height position of the internal camera 410 and outputs the second adjustment signal to the communication device 120. The communication device 120 transmits the output second adjustment signal to the internal imaging device 400. The raising/lowering mechanism 421 of the internal imaging device 400 raises and lowers the mounting plate 422 on the basis of the transmitted second adjustment signal to adjust the height position of the internal camera 410.

The adjustment controller 171 may decide the recommended height position as a predetermined value or may decide the recommended height position on the basis of user information including information about the user U such as a height, an age, and a gender of the user U. The adjustment controller 171 may decide a height position of the user U on the basis of a request of the user U. By adjusting the height position according to these conditions, for example, it is possible to flexibly to cope with a case where the user U is a child and the height position of the user U is not desired to be excessively high or the like.

When the communication device 120 has received the switching request signal transmitted by the terminal device 200, the switcher 172 generates a switching signal for switching the imaging mode of the internal camera 410 and outputs the generated switching signal to the communication device 120. The communication device 120 transmits the switching signal output by the switcher 172 to the internal camera 410.

The adjustment controller 171 and the switcher 172 in the imaging controller 170 may be provided together or independently in at least one of the terminal device 200 and the internal imaging device 400. In these cases, the recommended state data 156 may be stored in the terminal device 200 or the internal imaging device 400.

The guidance controller 180 causes the wheels 112 to guide a ridable moving object 100 positioned in the vicinity of the photo spot PS to a recommended position in the photo spot PS or causes a movement path, which will be displayed on the terminal device 200, to be generated on the basis of a position signal transmitted by the terminal device 200 and the recommended position data included in the recommended state data 156 stored in the storage 152. By guiding the ridable moving object to the recommended position, the guidance controller 180 executes an imaging assistance process for imaging the ridable moving object 100 and the user U with the internal camera 410.

The guidance planner 181 generates a movement plan including a movement path from a current position of the ridable moving object 100 indicated in the position signal transmitted by the terminal device 200 to a recommended position and the driving of the wheels 112. In the guidance planner 181, a first guidance mode or a second guidance mode is preset as the guidance mode. The first guidance mode is a guidance mode in which the wheels 112 are driven in accordance with the control of the drive guidance controller 182 and the ridable moving object 100 is moved. The second guidance mode is a guidance mode in which the ridable moving object 100 is moved according to an operation of the user.

Figure 6:
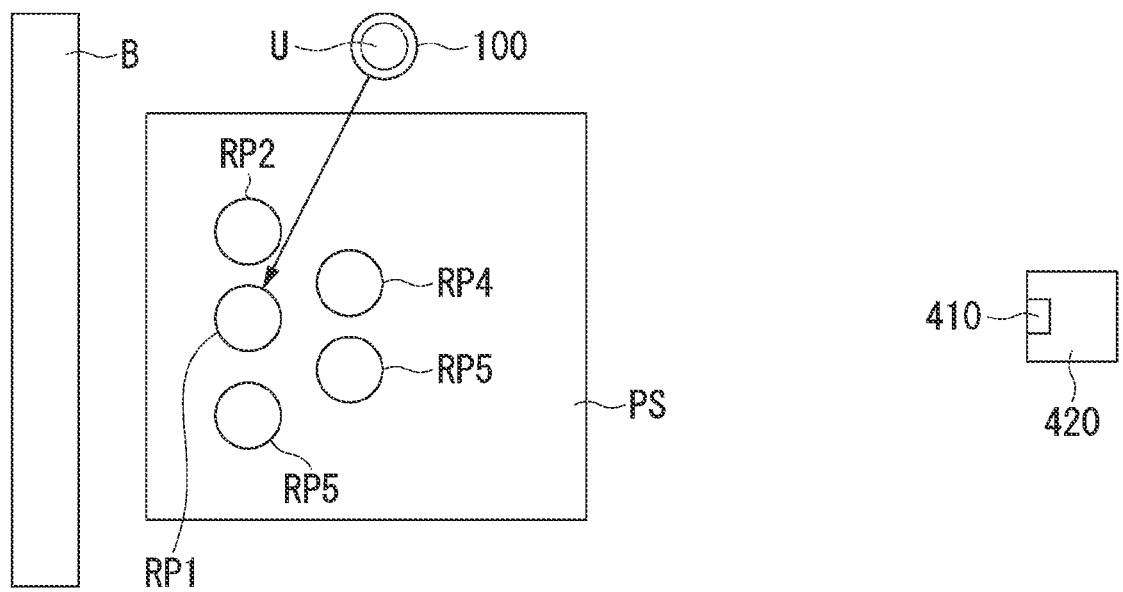
FIG. 6 is a diagram for describing a recommended position where the ridable moving object 100 moves in a photo spot PS.
Figure 7:
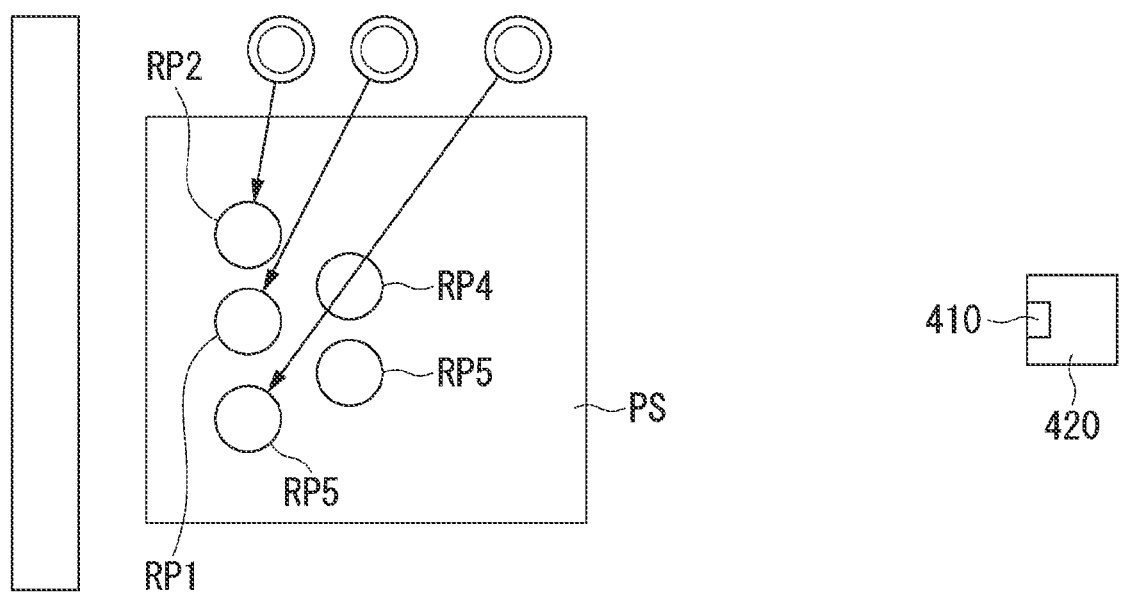
FIG. 7 is a diagram for describing a recommended position where a plurality of ridable moving objects 100 move in a photo spot PS.

FIGS. 6 and 7 are diagrams for describing the recommended position where the ridable moving object 100 moves in the photo spot PS. It is assumed that, for example, five recommended positions from a first recommended position RP1 to a fifth recommended position RP5, are set in the photo spot PS. When the user U is acting alone, as shown in FIG. 6, the ridable moving object 100 is guided to any one of the recommended positions from the first recommended position RP1 to the fifth recommended position RP5. At this time, when the user U is alone, the first to fifth recommended positions RP1 to RP5 may be set.

Also, as shown in FIG. 7, when a plurality of users grouped at the time of a reservation for the ridable moving object 100, here, three users of first to third users U1 to U3, are acting, a recommended position for each of the first to third users U1 to U3 is decided on from among the first to fifth recommended positions RP1 to RP5 and the ridable moving object 100 for each of the first to third users U1 to U3 is guided to the decided recommended position. A plurality of users may be grouped at any time other than the reservation time for the ridable moving object 100.

The drive guidance controller 182 generates a control signal on the basis of the movement plan generated by the guidance planner 181 when the first guidance mode is set as the guidance mode in the guidance planner 181. The control signal is a signal for driving the wheel 112 and causing the ridable moving object 100 to perform an action (movement) according to the movement plan. The drive guidance controller 182 outputs the generated control signal to the command generator 190. The wheel 112 is an example of a guide.

The instruction guidance controller 183 outputs a movement plan signal based on the movement plan generated by the guidance planner 181 to the communication device 120 when the second guidance mode is set as the guidance mode in the guidance planner 181. The communication device 120 transmits the output movement plan signal to the terminal device 200. The terminal device 200 receives the transmitted movement plan signal through the terminal communicator 220 and outputs the received movement plan signal to the terminal controller 230.

The terminal controller 230 causes the touch panel 210 to display the movement path of the ridable moving object 100 corresponding to the received movement plan signal. The touch panel 210 of the terminal device 200 is an example of the guide. The terminal controller 230 may cause a sound of a movement direction of the ridable moving object 100 along the moving path or the like to be output via a speaker (not shown).

The command generator 190 includes a center-of-gravity estimator 191 and a balance controller 192. The center-of-gravity estimator 191 estimates centers of gravity of physical objects including the user U having gotten on the ridable moving object 100, the moving object body 110, and the seat 113 on the basis of outputs of the acceleration sensor 141 and the angular velocity sensor 142.

The balance controller 192 generates a control command in a direction in which a position of the center of gravity estimated by the center-of-gravity estimator 191 returns to a reference position (the position of the center of gravity in the stationary state). For example, when the position of the center of gravity is biased to the right rear of the reference position, the balance controller 192 generates information indicating acceleration toward the right rear as a control command. When the control signal has been output by the guidance controller 180, the command generator 190 generates information indicating that the ridable moving object 100 moves along the movement path included in the control signal as a control command.

For example, when the action command is accelerated forward movement and the position of the center of gravity is behind the reference position, the balance controller 192 may limit the acceleration such that the position of the center of gravity is not further biased to a rearward position according to the accelerated forward movement or may start accelerated forward movement after a temporary retreat operation and the guidance of the position of the center of gravity to a forward position are performed. The command generator 190 outputs the control command generated by the balance controller 192 to the motor controller 198. The motor controller 198 individually controls each motor attached to the wheel 112 on the basis of the control command output by the command generator 190.

Figure 8:
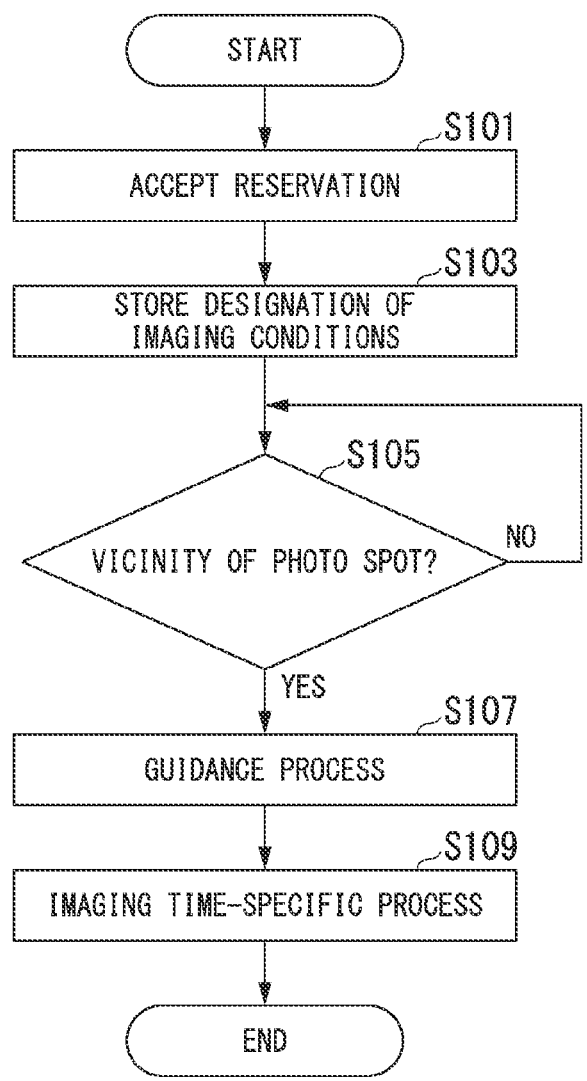
FIG. 8 is a flowchart showing an example of a process of a control device 150.

Next, a control process of the control device 150 will be described. FIG. 8 is a flowchart showing an example of a process of the control device 150. When a reservation request signal transmitted by the terminal device 200 is received in the reservation receiver 161, the control device 150 receives a reservation for the ridable moving object 100 by the user U (step S101). Subsequently, the control device 150 receives a designation request signal in the designation receiver 162 and causes the storage 152 to store imaging conditions indicated in the designation request signal (step S103). Subsequently, the user U gets on a reserved ridable moving object 100 and moves within the amusement facility P.

Subsequently, the control device 150 determines whether or not the ridable moving object 100 of the user U has reached a position near a photo spot PS on the basis of a position signal transmitted by the position detection device 130 (S105). When it is determined that the ridable moving object 100 on which the user U will get has not reached a position near the photo spot PS, the control device 150 iterates the processing of step S105.

Figure 9:
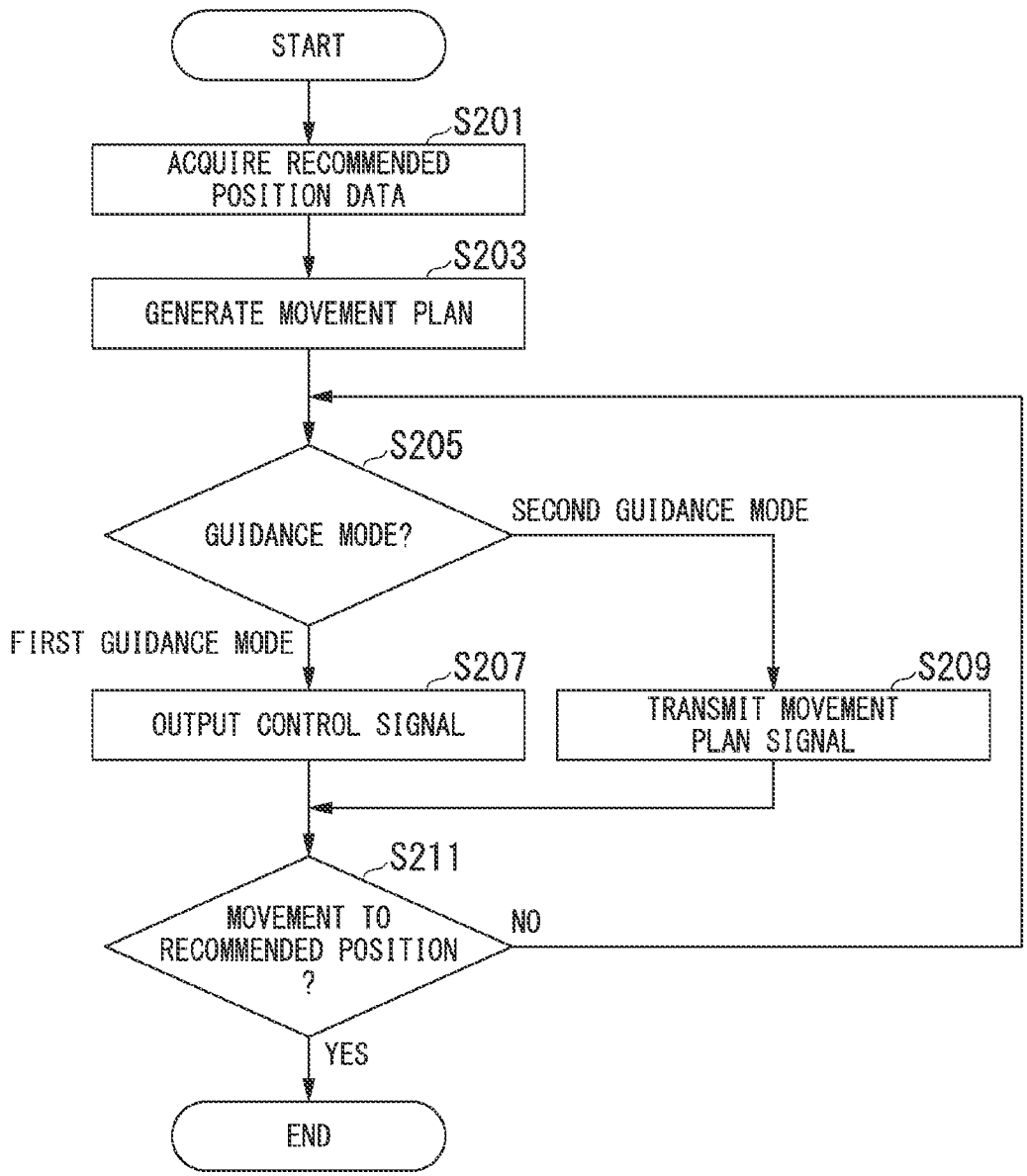
FIG. 9 is a flowchart showing an example of a guidance process.

When it is determined that the ridable moving object 100 on which the user U will get has reached a position near the photo spot PS, the control device 150 executes a guidance process of guiding the ridable moving object 100 to the recommended position within the photo spot PS as an imaging assistance process of the internal camera 410 (step S107). A specific procedure of the guidance process will be described below. FIG. 9 is a flowchart showing an example of the guidance process.

In the control device 150, the guidance planner 181 in the guidance controller 180 acquires a recommended position in the photo spot PS where the ridable moving object 100 of the user U has reached a nearby position on the basis of the recommended position data stored in the storage 152 (step S201). Subsequently, the guidance planner 181 generates a movement plan for moving the ridable moving object 100 from the position of the ridable moving object 100 detected by the position detection device 130 to the recommended position acquired on the basis of the recommended position data (step S203). The movement plan includes information such as a movement path when the ridable moving object 100 moves.

Subsequently, the guidance planner 181 determines whether the set guidance mode is the first guidance mode or the second guidance mode (step S205). When the guidance planner 181 determines that the set guidance mode is the first guidance mode, the drive guidance controller 182 generates a control signal corresponding to the movement plan and outputs the generated control signal to the command generator 190 (step S207). The command generator 190 generates information about the movement of the ridable moving object 100 along the movement path included in the control signal as a control command and controls the motor of the omnidirectional moving wheel 112.

When the guidance planner 181 determines that the set guidance mode is the second guidance mode, the instruction guidance controller 183 outputs the movement plan signal based on the movement plan generated by the guidance planner 181 to the communication device 120 (step S209). The terminal controller 230 causes the touch panel 210 to display the movement path of the ridable moving object 100 corresponding to the received movement plan signal and causes the ridable moving object 100 to move to the user U who has seen the display of the touch panel 210.

Subsequently, the guidance planner 181 determines whether or not the ridable moving object 100 has moved to a recommended position (step S211). When it is determined that the ridable moving object 100 has not moved to the recommended position, the guidance planner 181 waits for, for example, the elapse of the movement waiting time, and returns the process to step S205. The processing of step S211 is iterated until the movement waiting time elapses. When it is determined that the ridable moving object 100 has moved to the recommended position or when the movement waiting time has elapsed, the control device 150 ends the process shown in FIG. 9.

Figure 10:
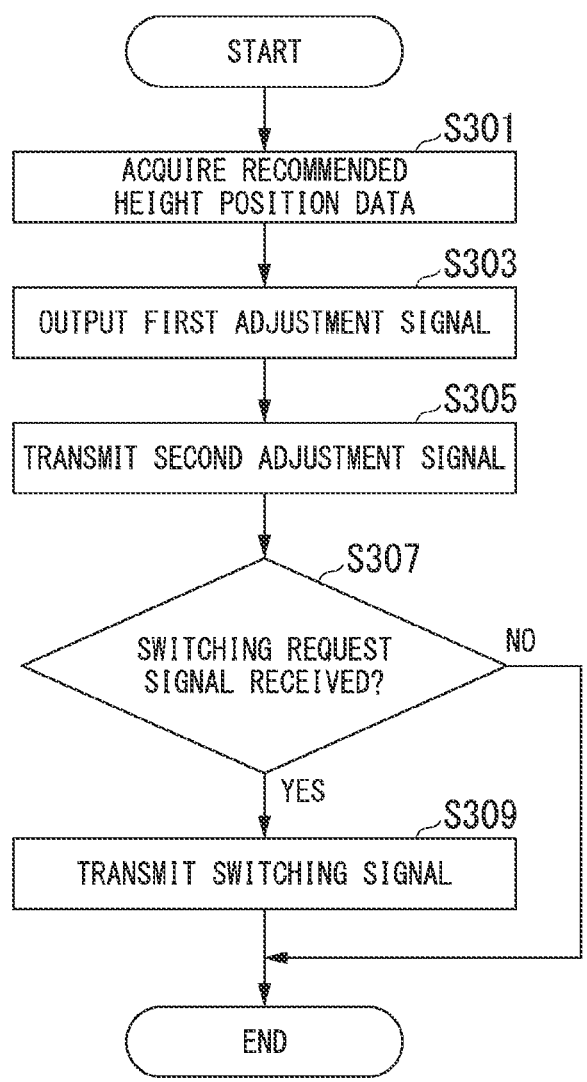
FIG. 10 is a flowchart showing an example of an imaging time-specific process.

Returning to FIG. 8, the control device 150 subsequently executes an imaging time-specific process when the user getting on the ridable moving object 100 guided to the recommended position is imaged (step S109) and ends the process shown in FIG. 8. A specific procedure of the imaging time-specific process will be described below. FIG. 10 is a flowchart showing an example of the imaging time-specific process.

In the control device 150, the adjustment controller 171 in the imaging controller 170 acquires recommended height position data at the recommended position to which the ridable moving object 100 of the user U moves (step S301). Subsequently, the adjustment controller 171 generates a first adjustment signal on the basis of the height position of the user U according to the acquired recommended height position data and outputs the generated first adjustment signal to the seat raising/lowering device 116 (step S303). The seat raising/lowering device 116 adjusts the height position of the user U to the height position indicated in the recommended height position data by raising and lowering the seat 113 on the basis of the output first adjustment signal.

Subsequently, the adjustment controller 171 generates a second adjustment signal based on the height position of the internal camera 410 corresponding to the acquired recommended height position data and transmits the generated second adjustment signal to the internal imaging device 400 using the communication device 120 (step S305). The raising/lowering mechanism 421 of the internal imaging device 400 raises and lowers the mounting plate 422 on the basis of the transmitted second adjustment signal to adjust the height position of the internal camera 410 to the height position indicated in the recommended height position data.

Subsequently, the switcher 172 determines whether or not a switching request signal transmitted by the terminal device 200 has been received (step S307). When it is determined that the switching request signal has not been received, the control device 150 ends the process shown in FIG. 10. When it is determined that the switching request signal has been received, the switcher 172 generates a switching signal corresponding to the switching request signal and transmits the generated switching signal to the internal imaging device 400 (step S309). Subsequently, the control device 150 ends the process shown in FIG. 10.

The imaging system 1 of the first embodiment causes the guide to guide the ridable moving object 100 positioned in the vicinity of the registered photo spot PS to the recommended position in the photo spot PS. Thus, the ridable moving object 100 can be moved to a position suitable for taking a photo, for example, a position where a background is beautiful or a character to be shown in a photo together is deployed, or the like as the recommended position. Therefore, the subject can be positioned at a position suitable for imaging.

Second Embodiment

Figure 11:
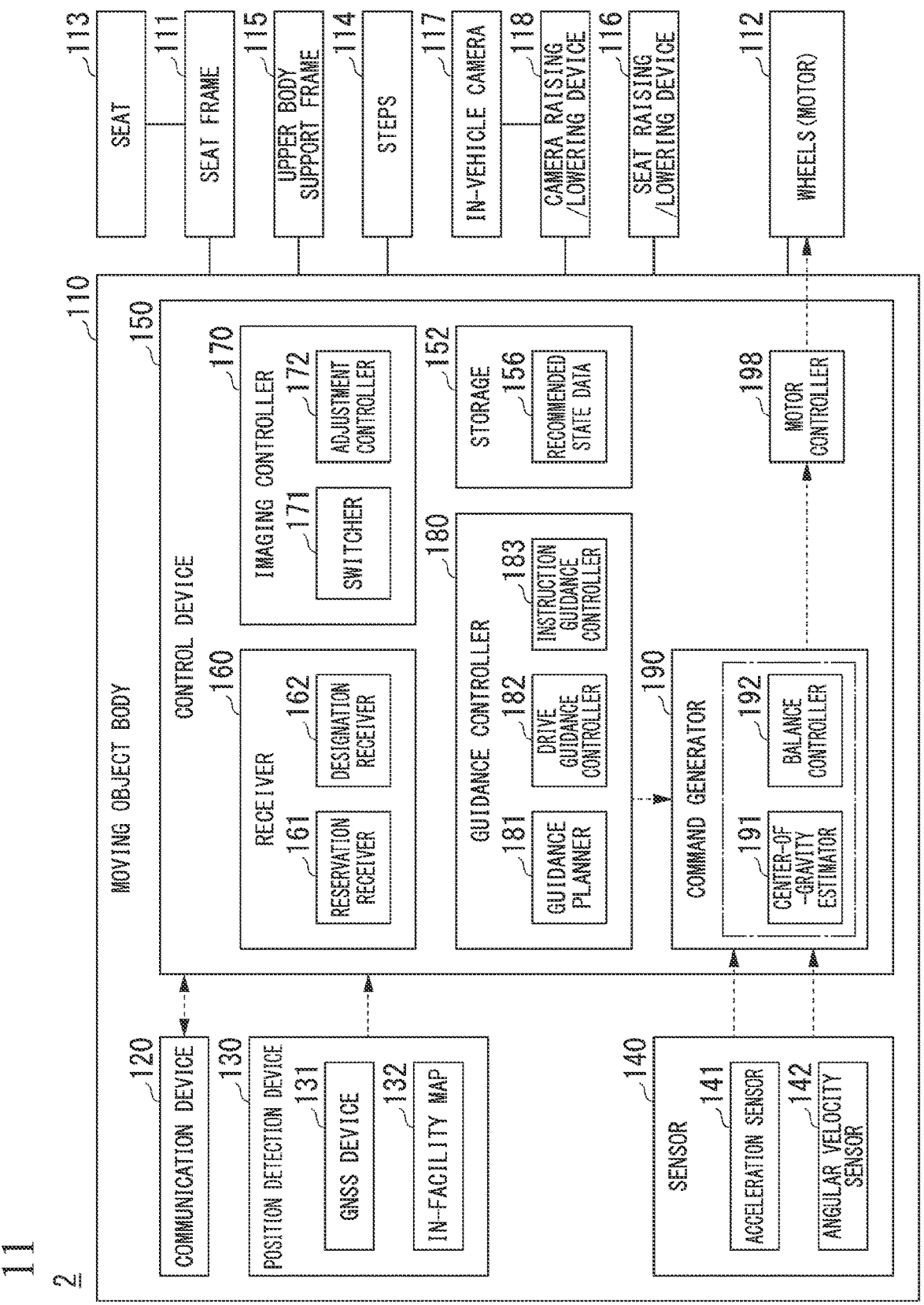
FIG. 11 is a configuration diagram showing an example of a ridable moving object 100 of a second embodiment.
Figure 12:
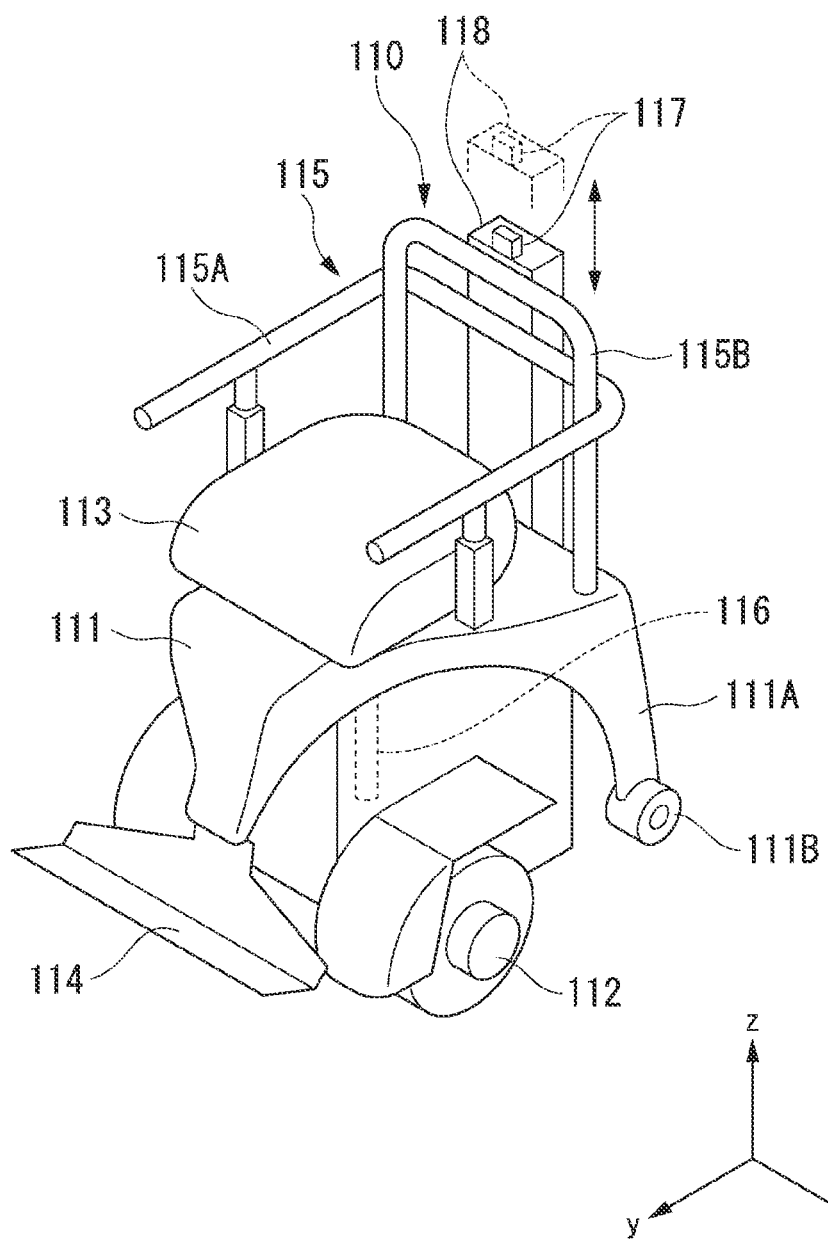
FIG. 12 is a perspective view showing an internal structure of the ridable moving object 100 of the second embodiment.

Next, a second embodiment will be described. FIG. 11 is a configuration diagram showing an example of a ridable moving object 100 and FIG. 12 is a perspective view showing an internal structure of the ridable moving object 100 of the second embodiment. An imaging system 2 of the second embodiment is different from the imaging system 1 of the first embodiment mainly in that the ridable moving object 100 includes an in-vehicle camera 117 and a camera raising/lowering device 118. In the description of the second embodiment, members, functions, and the like that are the same as those of the first embodiment may be denoted by the same reference signs and description thereof may be omitted.

The in-vehicle camera 117 functions, for example, like the internal camera 410 of the internal imaging device 400, and the camera raising/lowering device 118 functions, for example, like the raising/lowering device 420 of the internal imaging device 400. The camera raising/lowering device 118 is provided behind a seat frame 111. The in-vehicle camera 117 is attached to the top of the camera raising/lowering device 118.

The camera raising/lowering device 118 adjusts a height position of the in-vehicle camera 117 by raising and lowering the in-vehicle camera 117 mounted on the top thereof according to a raising-lowering process. The in-vehicle camera 117 is, for example, a digital camera. In the in-vehicle camera 117, a first imaging mode and a second imaging mode are set as imaging modes similar to those of the internal camera 410.

In the imaging system 2 of the second embodiment, for example, ridable moving objects 100 may include a ridable moving object on which the user gets and a ridable moving object on which a cast member gets. In the imaging system 2 of the second embodiment, as in the first embodiment, the ridable moving object 100 on which the user U gets is guided to a recommended position of the photo spot PS when it is positioned in the vicinity of the photo spot PS.

Subsequently, in the imaging system 1 of the first embodiment, the user U and the ridable moving object 100 are imaged by the internal camera 410 of the internal imaging device 400. On the other hand, in the imaging system 2 of the second embodiment, the in-vehicle camera mounted on a ridable moving object (hereinafter referred to as an imaging ridable moving object) other than a ridable moving object 100 (hereinafter referred to as a target ridable moving object) on which the user U gets images the user U and the ridable moving object 100.

The target ridable moving object serving as an imaging target is guided to the recommended position of the photo spot PS according to the guidance of the guidance controller 180 in the control device 150 similar to that of the first embodiment.

Subsequently, the imaging ridable moving object moves to a position where the internal imaging device 400 according to the first embodiment is provided. The imaging ridable moving object may be a ridable moving object 100 on which any person gets arranged within an amusement facility P. For example, a person getting on the ridable moving object 100 may be another customer of the amusement facility P who interacts with the user U, another customer of the amusement facility P who does not interact with the user U, or a cast member of the amusement facility P. Alternatively, the ridable moving object 100 may travel autonomously without a person having gotten thereon.

The imaging system 2 of the second embodiment has an operation and effects similar to those of the imaging system 1 of the first embodiment. Further, in the imaging system 2 of the second embodiment, the imaging ridable moving object images the user U and the ridable moving object 100 at the recommended position of the photo spot PS. Thus, the user U and the ridable moving object 100 can be imaged at an imaging position even in a spot where the internal imaging device 400 is not disposed or the like.

Although the receiver 160 and the imaging controller 170 are provided in the control device 150 of the ridable moving object 100 in the imaging systems 1 and 2 of the above-described embodiments, one or both of them may be provided in a management sever or the like separately provided in the amusement facility P. In addition, some of functions provided in the control device 150 of the ridable moving object 100 and functions provided in the terminal device 200 may be provided in the management server. Alternatively, some of the functions provided in the control device 150 of the ridable moving object 100 or the functions provided in the terminal device 200 may be mutually provided in the terminal device 200 or the control device 150 of the ridable moving object 100.

Although the terminal device 200 is premised on the fact that an application program (a moving object rental application) is activated in each of the above-described embodiments, it is only necessary to activate the application program when at least the user U is making a reservation for the ridable moving object 100 or when a control process of the instruction guidance controller 183 is being executed.

The above-described embodiment can be implemented as follows.

A guidance device including:

a storage device storing a program; and a hardware processor, wherein the hardware processor executes the program stored in the storage device, such that a computer causes a guide to guide a ridable moving object on which a user gets and which is positioned near a registered photo spot included in an imaging range of an imager for imaging the ridable moving object to a recommended position in the photo spot.

Further, the above-described embodiment can be implemented as follows.

An imaging assistance method including:

causing, by a computer, a guide to guide a ridable moving object on which a user gets and which is positioned near a registered photo spot included in an imaging range of an imager for imaging the ridable moving object to a recommended position in the photo spot; and imaging, by the imager, the ridable moving object positioned at the photo spot.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging system comprising:
an imager configured to image a ridable moving object positioned at a registered photo spot; and
a processor configured to execute a program to cause a guide to guide the ridable moving object on which a user gets and which is positioned adjacent the photo spot to a recommended position in the photo spot,
wherein the imager is configured to perform imaging based on a first imaging mode in which the imaging is performed when a prescribed period of time has elapsed after an execution operation of an instructor was performed and a second imaging mode in which the imaging is performed in accordance with an operation of an operator, and
wherein the processor is further configured to switch the imaging mode to the first imaging mode or the second imaging mode.

2. The imaging system according to claim 1, wherein the processor is further configured to cause the guide to guide a plurality of grouped ridable moving objects to the recommended position.

3. The imaging system according to claim 2, wherein the processor is further configured to:

receive a reservation for the plurality of grouped ridable moving objects; and cause the guide to guide the plurality of grouped ridable moving objects at the time of the reservation to the recommended position.

4. The imaging system according to claim 1, wherein the processor is further configured to:

receive designation of an imaging condition at the time of imaging by the imager; and cause the guide to guide the ridable moving object in accordance with the imaging condition.

5. The imaging system according to claim 1, further comprising:

a first adjuster configured to adjust a height position of the user getting on the ridable moving object; and a second adjuster configured to adjust a height position of the imager, wherein the processor is further configured to adjust at least one of height positions of the first adjuster and the second adjuster.

6. The imaging system according to claim 5, wherein the first adjuster adjusts the height position on a basis of at least one of user information about the user and a request of the user.

7. The imaging system according to claim 1, wherein the processor is configured to cause the ridable moving object to be driven or instruct the user to operate the ridable moving object.

8. An imaging system comprising:

an imager configured to image a ridable moving object positioned at a registered photo spot; and a processor configured to execute a program to cause a guide to guide the ridable moving object on which a user gets and which is positioned near the photo spot to a recommended position in the photo spot, wherein the imager is installed in another ridable moving object different from the ridable moving object.

* * * * *